(12) United States Patent
Kawahara et al.

(10) Patent No.: US 9,051,977 B2
(45) Date of Patent: Jun. 9, 2015

(54) LOCK-UP DEVICE FOR TORQUE CONVERTER

(75) Inventors: Yuki Kawahara, Osaka (JP); Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/008,938

(22) PCT Filed: Feb. 24, 2012

(86) PCT No.: PCT/JP2012/054547
§ 371 (c)(1),
(2), (4) Date: Sep. 30, 2013

(87) PCT Pub. No.: WO2012/147404
PCT Pub. Date: Nov. 1, 2012

(65) Prior Publication Data
US 2014/0014453 A1    Jan. 16, 2014

(30) Foreign Application Priority Data

Apr. 28, 2011  (JP) .................................. 2011-100862
Nov. 1, 2011   (JP) .................................. 2011-239867

(51) Int. Cl.
*F16D 31/08* (2006.01)
*F16H 45/02* (2006.01)

(52) U.S. Cl.
CPC ................ *F16D 31/08* (2013.01); *F16H 45/02* (2013.01); *F16H 2045/021* (2013.01); *F16H 2045/0221* (2013.01); *F16H 2045/0284* (2013.01)

(58) Field of Classification Search
None
See application file for complete search history.

(56) References Cited

U.S. PATENT DOCUMENTS

| | | | | |
|---|---|---|---|---|
| 5,941,354 A | * | 8/1999 | Fukushima et al. | ......... 192/3.28 |
| 6,257,383 B1 | * | 7/2001 | Ohkubo et al. | ............. 192/3.29 |
| 2001/0052443 A1 | | 12/2001 | Tomiyama et al. | |

FOREIGN PATENT DOCUMENTS

| | | |
|---|---|---|
| JP | 2002-048217 A | 2/2002 |
| JP | 2002-089658 A | 3/2002 |
| JP | 2010-048291 A | 3/2010 |

* cited by examiner

*Primary Examiner* — Ramya Burgess
*Assistant Examiner* — Mark Manley
(74) *Attorney, Agent, or Firm* — Global IP Counselors, LLP (57) ABSTRACT

The lock-up device includes: a clutch part disposed between a front cover and a turbine; and a damper mechanism for transmitting torque from the clutch part to the turbine and for absorbing and attenuating a torsional vibration. The damper mechanism includes: an input plate into which torque is inputted from the clutch part; an output plate connected to the turbine; a plurality of torsion springs; an intermediate member; and a restriction member. The intermediate member is rotatable relatively to the input plate and the output plate, and causes two torsion springs to act in series. The restriction member is mounted to the input plate, and restricts the intermediate member from moving in both of an axial direction and a radial direction.

5 Claims, 4 Drawing Sheets

LOCK-UP DEVICE FOR TORQUE CONVERTER

CROSS-REFERENCES TO THE RELATED APPLICATIONS

This U.S. national phase application claims priority to Japanese Patent Application Nos. 2011-100862 and 2011-239867 filed on Apr. 28, 2011 and Nov. 1, 2011 respectively. The entire disclosure of Japanese Patent Application Nos. 2011-100862 and 2011-239867 is hereby incorporated herein by reference

TECHNICAL FIELD

The present invention relates to a lock-up device, particularly to a lock-up device for a torque converter, which is configured to transmit or block torque from a front cover to a turbine of the torque converter.

BACKGROUND ART

In many cases, a torque converter is provided with a lock-up device for directly transmitting torque from a front cover to a turbine. The lock-up device includes: a piston that can be frictionally coupled to the front cover; a drive plate fixed to the piston; a plurality of torsion springs supported by the drive plate; and a driven plate elastically coupled to the piston by the plural torsion springs in the rotational direction. The driven plate is fixed to the turbine.

Further, a lock-up device of so-called a multi-plate type using a plurality of clutch plates has been already proposed for increasing the clutch capacity in the lock-up device (see PTL 1).

When torque is herein transmitted by the lock-up device, reduction in stiffness and expansion in a torsion angle are required for the torsion springs in order to effectively absorb and attenuate variation in torque inputted thereto from an engine. In view of this, such a device as described in PTL 2 has been proposed. Pairs of torsion springs, composing a damper mechanism, herein act in series through an intermediate member.

CITATION LIST

Patent Literature

PTL 1: Japan Laid-open Patent Application Publication No. JP-A-2010-48291
PTL 2: Japan Laid-open Patent Application Publication No. JP-A-2002-89657

SUMMARY

Technical Problems

The intermediate member described in PTL 2 is rotatable relatively to both of input-side and output-side members in the damper mechanism. Further, in PTL 2, the intermediate member is restricted from moving in both of the axial direction and the radial direction by an input-side plate fixed to a piston composing the lock-up device.

Now, particularly in such a lock-up device of the multi-plate type as described in PTL 1, the piston and the damper mechanism are disposed away from each other. In the lock-up device thus structured, the intermediate member cannot be supported by the piston and the input-side plate of the damper mechanism. Further, in the lock-up device of the multi-plate type, the axial space of a clutch part is increased, and therefore, a large axial space cannot be produced for a mechanism for supporting the intermediate member and restricting moving of the intermediate member.

It is an advantage of the present invention to implement a mechanism for restricting moving of an intermediate member with a smaller space, particularly, in a lock-up device that a piston and a damper mechanism are disposed in positions away from each other.

Solution to Problems

A lock-up device for a torque converter according to a first invention is a device configured to allow or block transmission of a torque from a front cover to a turbine of the torque converter, and includes a clutch part and a damper mechanism. The clutch part is disposed between the front cover and the turbine, includes a plurality of clutch plates and a piston for pressing the plurality of clutch plates to each other, and is configured to allow or block transmission of the torque. The damper mechanism is configured to transmit the torque from the clutch part to the turbine and absorb and attenuate a torsional vibration. Further, the damper mechanism includes: an input-side member into which the torque is inputted from the clutch part; an output-side member connected to the turbine; a plurality of elastic members elastically coupling the input-side member and the output-side member in a rotational direction; an intermediate member; and a restriction member. The intermediate member is rotatable relatively to the input-side member and the output-side member, and causes at least two of the plurality of elastic members to act in series. The restriction member is mounted to the input-side member, and restricts the intermediate member from moving in both of a radial direction and an axial direction.

In the device, when the clutch part is in a clutch-on (power transmitted) state, the torque from the front cover is inputted into the damper mechanism from the clutch part and is outputted to the turbine while a torsional vibration is absorbed and attenuated therein. In the damper mechanism, the torque is inputted into the input-side member and is outputted to the turbine through the plural elastic members and the output-side member. At this time, at least two of the plural elastic members act in series through the intermediate member. Therefore, a large damper torsional angle can be produced and low stiffness can be achieved. Further, the intermediate member is restricted from moving in both of the axial direction and the radial direction by the restriction member mounted to the input-side member of the damper mechanism.

Here, the intermediate member is designed to be restricted from moving in both of the axial direction and the radial direction by the restriction member mounted to the input-side member of the damper mechanism. The device space can be thereby reduced in the axial direction. Therefore, the present invention is effective for a lock-up device of a multi-plate type that the clutch part occupies a relatively large space.

A lock-up device for a torque converter according to a second invention relates to the lock-up device of the first invention, and wherein the intermediate member is formed by an annular plate member. Further, the restriction member is fixed at an inner peripheral part thereof to the input-side member of the damper mechanism, and has a radial restriction portion and an axial restriction portion on an outer peripheral part thereof. The radial restriction portion restricts the intermediate member from moving in the radial direction by supporting an inner peripheral end of the intermediate member. The axial restriction portion restricts the intermediate member from moving in the axial direction by interposing an inner peripheral end portion of the intermediate member between the axial restriction portion and the input-side member of the damper mechanism.

Here, similarly to the above, the space occupied by the entire device can be saved by reducing the space in the axial direction.

A lock-up device for a torque converter according to a third invention relates to the lock-up device of the first invention, and wherein the intermediate member has: an inner peripheral end portion extending along the input-side member; a lateral support portion supporting front-cover-side lateral parts of the elastic members; and an outer support portion that is extending towards the turbine from an outer peripheral end of the lateral support portion and supports outer peripheral parts of the elastic members. Further, the restriction member is fixed at an inner peripheral part thereof to the input-side member of the damper mechanism. The restriction member has, on an outer peripheral part thereof, a radial restriction portion restricting the intermediate member from moving in the radial direction by supporting an inner peripheral end of the intermediate member; and an axial restriction portion restricting the intermediate member from moving in the axial direction by interposing the lateral support portion of the intermediate member between the axial restriction portion and the elastic members.

Here, similarly to the above, the space occupied by the entire device can be saved by reducing the space in the axial direction.

A lock-up device for a torque converter according to a fourth invention relates to the lock-up device of the second or third invention, and wherein the plurality of elastic members, the intermediate member, and both of the radial restriction portion and the axial restriction portion of the restriction member are disposed on an outer peripheral side of the clutch part.

A lock-up device for a torque converter according to a fifth invention relates to the lock-up device of any of the second to fourth inventions, and wherein the restriction member is formed by a plate member with a thickness less than a thickness of the intermediate member.

Here, the thickness of the restriction member is less than that of the intermediate member. Therefore, the axial space can be further reduced.

A lock-up device for a torque converter according to a sixth invention relates to the lock-up device of the first invention, and wherein the intermediate member is formed by an annular plate member. Further, the restriction member has a radial restriction portion and an axial restriction portion, both of which are formed on a part of the input-side member of the damper mechanism. The radial restriction portion restricts the intermediate member from moving in the radial direction by supporting an inner peripheral end of the intermediate member, whereas the axial restriction portion restricts the intermediate member from moving in the axial direction by interposing an inner peripheral end portion of the intermediate member between the axial restriction portion and the input-side member of the damper mechanism.

Here, the restriction member is restricted from moving in both of the radial direction and the axial direction by a part of the input-side member of the damper mechanism. Therefore, the space can be further saved in the axial direction.

DETAILED DESCRIPTION OF PREFERRED EMBODIMENTS

[Entire Structure of Torque Converter]

Figure 1:
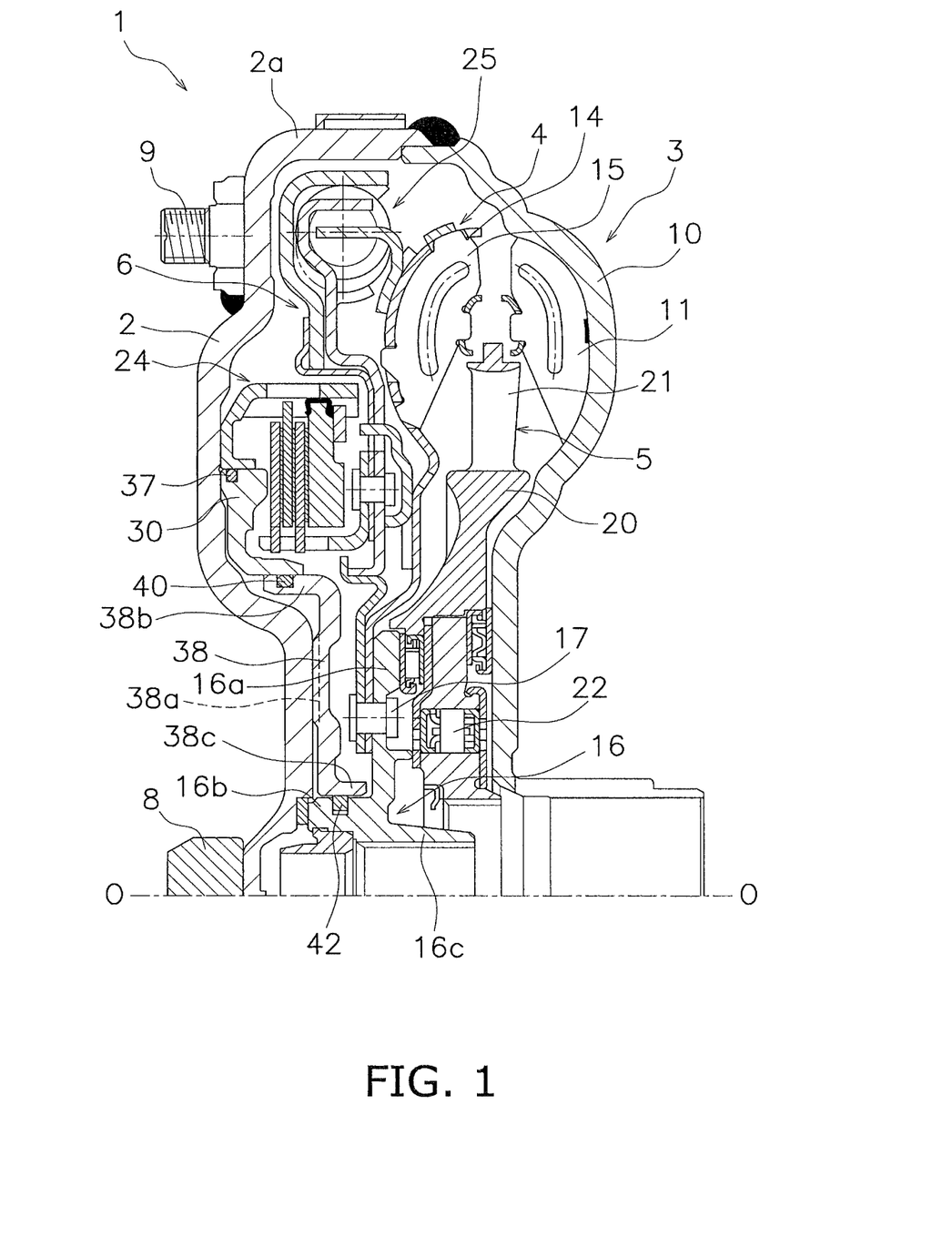
FIG. 1 is a partial cross-sectional view of a torque converter equipped with a lock-up device according to an exemplary embodiment of the present invention.

FIG. 1 is a vertical cross-sectional view of a torque converter 1 employing an exemplary embodiment of the present invention. The torque converter 1 is a device for transmitting torque from a crankshaft of an engine to an input shaft of a transmission. In FIG. 1, the engine (not illustrated in the figure) is disposed on the left side, whereas the transmission (not illustrated in the figure) is disposed on the right side. A line O-O depicted in FIG. 1 indicates a rotary axis of the torque converter 1.

The torque converter 1 mainly includes a front cover 2, three types of vane wheels (an impeller 3, a turbine 4 and a stator 5) and a lock-up device 6.

[Front Cover]

The front cover 2 is a disc-shaped member that a center boss 8 is fixed to the inner peripheral end thereof by welding. The center boss 8 is a cylindrical member extending in the axial direction, and is inserted into a center hole of the crankshaft (not illustrated in the figures).

It should be noted that the front cover 2 is designed to be coupled to the crankshaft of the engine through a flexible plate, although not illustrated in the figures. In other words, a plurality of bolts 9 are fixed to the engine-side surface of the outer peripheral part of the front cover 2, while being aligned at equal intervals in the circumferential direction. The outer peripheral part of the flexible plate is fixed to the front cover 2 by nuts screwed onto the bolts 9.

An outer peripheral side tubular portion 2a is formed in the outer peripheral part of the front cover 2, while being extending axially towards the transmission. The impeller 3 is fixed to the tip end of the outer peripheral side tubular portion 2a by welding. As a result, the front cover 2 and the impeller 3 form a fluid chamber that operating oil is filled in the inside thereof.

[Impeller]

The impeller 3 is mainly includes an impeller shell 10 and a plurality of impeller blades 11 fixed to the inside of the impeller shell 10. Further, as described above, the outer peripheral tip end portion of the impeller shell 10 is welded to the front cover 2. It should be noted that a tubular portion is formed on an inner peripheral end portion of the impeller hub 10, while being extending towards the transmission.

[Turbine]

The turbine 4 is disposed axially in opposition to the impeller 3 within the fluid chamber. The turbine 4 mainly includes: a turbine shell 14; a plurality of turbine blades 15 fixed to the inside of the turbine shell 14; and a turbine hub 16 fixed to the inner peripheral end portion of the turbine shell 14. The turbine shell 14 and the turbine hub 16 are fixed by a plurality of rivets 17.

The turbine hub 16 has: a disc-shaped flange portion 16a to which the inner peripheral end portion of the turbine shell 14 is fixed; a first tubular portion 16b having a shape extending towards the engine from the inner peripheral part of the flange portion 16a; and a second tubular portion 16c having a shape extending oppositely to the first tubular portion 16b. Further, as described above, the turbine shell 14 is fixed to a roughly middle part of the flange portion 16a in the radial direction by the rivets 17. Yet further, a spline hole is formed in the inner peripheral part of the second tubular portion 16c, and is meshed with a spline shaft formed on the tip end of the input shaft of the transmission.

[Stator]

The stator 5 is a mechanism disposed between the inner peripheral part of the impeller 3 and that of the turbine 4, and serves to regulate the flow of the operating oil returning to the impeller 3 from the turbine 4. The stator 5 is integrally formed by molding of resin, aluminum alloy or the like. The stator 5 mainly includes an annular stator shell 20 and a plurality of stator blades 21 formed on the outer peripheral surface of the stator shell 20. The stator shell 20 is coupled to a stationary shaft (not illustrated in the figures) through a one-way clutch 22.

[Lock-Up Device]

The lock-up device 6 is a device disposed between the front cover 2 and the turbine 4, and serves to directly transmit power from the front cover 2 to the turbine 4. The lock-up device 6 includes: a clutch part 24 disposed between the front cover 2 and the turbine 4; and a damper mechanism 25 configured to transmit torque from the clutch part 24 to the turbine.

<Clutch Part>

The clutch part 24 is of a hydraulic actuated multi-plate type, and is configured to transmit the torque from the front cover 2 to the damper mechanism 25 or block transmission of torque between the front cover 2 and the damper mechanism 25. As illustrated in an enlarged view of FIG. 2, the clutch part 24 includes a clutch input member 26, a clutch output member 27, a single drive plate (first clutch plate) 28, two driven plates (second clutch plates) 29a and 29b and a piston 30.

Figure 2:
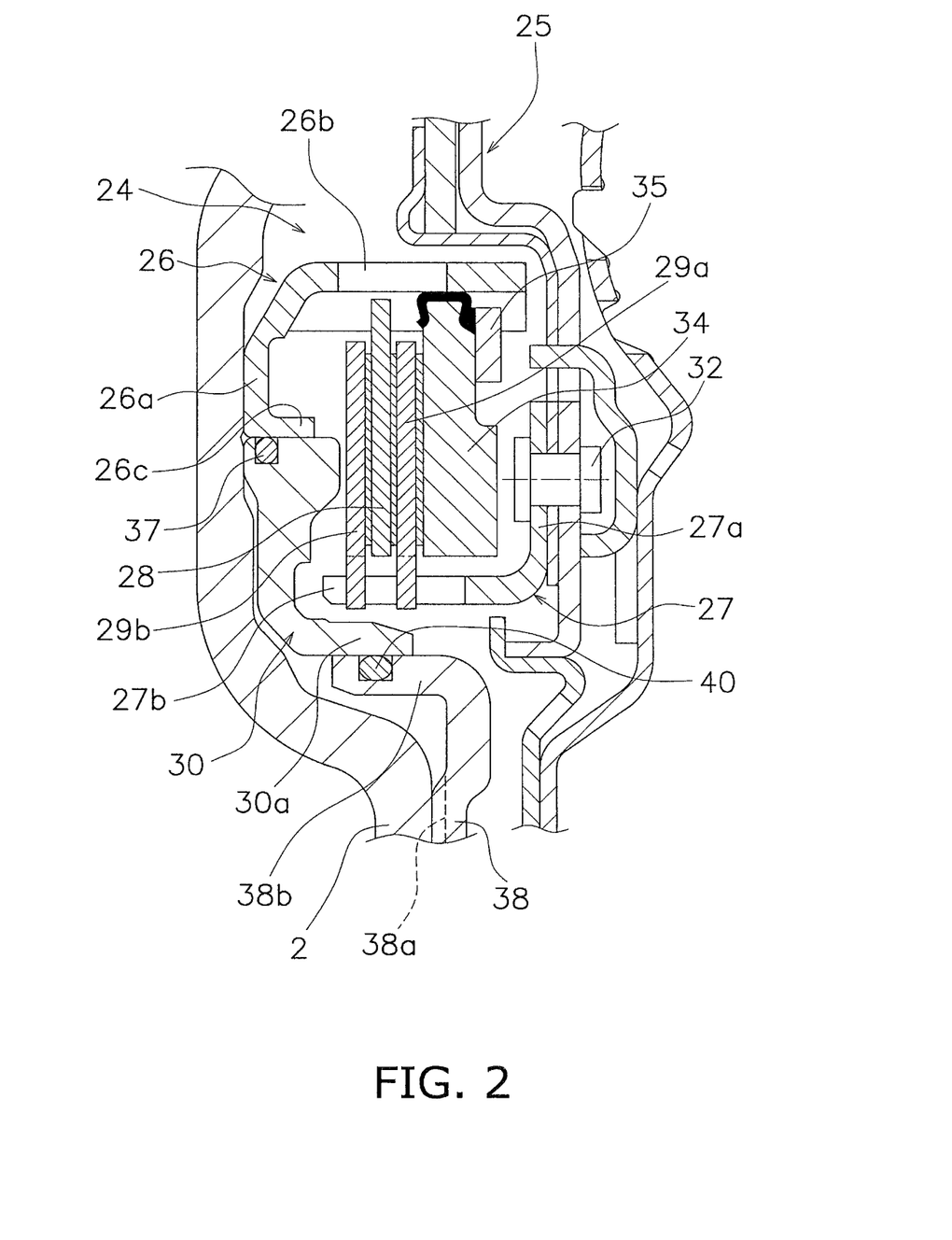
FIG. 2 is an enlarged view of a clutch part of the lock-up device illustrated in FIG. 1.

The clutch input member 26 is formed in an annular shape and has: a disc-shaped fixation portion 26a; an outer tubular portion 26b having a shape extending towards the transmission from the outer peripheral end of the fixation portion 26a; and an inner tubular portion 26c having a shape extending towards the transmission from the inner peripheral end of the fixation portion 26a. The fixation portion 26a is fixed to the turbine-4-side surface of the front cover 2 by welding. A plurality of convexo-concave portions are formed on the inner peripheral surface of the outer tubular portion 26b, while being axially extending and aligned at predetermined intervals in the circumferential direction.

The clutch output member 27 is formed in an annular shape and has: a disc portion 27a formed in a disc shape; and a tubular portion 27b having a shape extending towards the engine from the inner peripheral end of the disc portion 27a. The disc portion 27a is fixed to members composing the damper mechanism 25 by rivets 32. A plurality of grooves are formed on the tubular portion 27b, while being axially extending and aligned at predetermined intervals in the circumferential direction.

The drive plate 28 is formed in an annular shape. A plurality of teeth are formed on the outer peripheral end of the drive plate 28 so as to be engaged with the convexo-convex portions of the outer tubular portion 26b of the clutch input member 26. With such structure, the drive plate 28 is axially movable with respect to and non-rotatable relatively to the clutch input member 26.

The two driven plates 29a and 29b are formed in an annular shape. A plurality of teeth are formed on the inner peripheral ends of the both driven plates 29a and 29b so as to be engaged with the plural grooves of the tubular portion 27b of the clutch output member 27. With such structure, the both driven plates 29a and 29b are axially movable with respect to and non-rotatable relatively to the clutch output member 27. Further, annular friction members are respectively fixed to the both surfaces of the driven plate 29a disposed on the turbine-4 side. Moreover, an annular friction member is fixed to the turbine-4-side lateral surface of the driven plate 29b disposed on the front-cover-2 side. It should be noted that no friction member is mounted to the front-cover-2-side surface of the driven plate 29b.

An annular back-up ring 34 is mounted to the further turbine-4 side of the driven plate 29a. The back-up ring 34 has an inner diameter roughly the same as that of the friction member mounted to the driven plate 29b. Further, a plurality of teeth are formed on the outer peripheral end of the back-up ring 34 so as to be engaged with the convexo-concave portions of the outer tubular portion 26b of the clutch input member 26. With the structure, the back-up ring 34 is axially movable with respect to and non-rotatable relatively to the clutch input member 26. It should be noted that a snap ring 35 is mounted to the turbine-4 side of the back-up ring 34 in order to restrict the back-up ring 34 from moving towards the turbine 4. The snap ring 35 is engaged with an annular groove formed on the outer tubular portion 26b of the clutch input member 26.

The piston 30 is disposed between the front cover 2 and the driven plate 29b, while being disposed on the inner peripheral side of the clutch input member 26. The piston 30 is formed in an annular shape, and the outer peripheral surface thereof is supported by and slidable along the inner peripheral surface of the inner tubular portion 26c of the clutch input member 26. A seal member 37 is mounted to the outer peripheral surface of the piston 30, and seals between the piston 30 and the clutch input member 26. Further, a tubular portion 30a is formed on the inner peripheral end of the piston 30, while being extending towards the transmission. The inner peripheral surface of the tubular portion 30a of the piston 30 is supported by and slidable along a piston support member 38.

As illustrated in FIGS. 1 and 2, the piston support member 38 is disc-shaped member formed in an annular shape. The piston support member 38 is fixed to the front cover 2 at a plurality of positions in the circumferential direction by welding. It should be noted that FIG. 1 illustrates portions of the piston support member 38 that are fixed to the front cover 2, whereas grooves 38a (depicted with a broken line), penetrating in the radial direction, are formed on the other portions of the piston support member 38 that are unfixed to the front cover 2. The operating oil is configured to be supplied to the space produced between the piston 30 and the front cover 2 through the grooves 38a from the inner peripheral side. An outer tubular portion 38b is formed on the outer peripheral end of the piston support member 38 while being extending towards the engine, whereas an inner tubular portion 38c is formed on the inner peripheral end of the piston support member 38 while being extending towards the transmission. As described above, the outer tubular portion 38b is a portion for supporting the piston 30, and a seal member 40 is mounted thereto. The seal member 40 seals between the piston 30 and the piston support member 38. Further, the inner tubular portion 38c is supported by and slidable along the outer peripheral surface of the first tubular portion 16b of the turbine hub 16. Further, a seal member 42 is mounted to the outer peripheral surface of the first tubular portion 16b of the turbine hub 16. Accordingly, the seal member 42 seals between the piston support member 38 and the turbine hub 16.

<Damper Mechanism>

Figure 3:
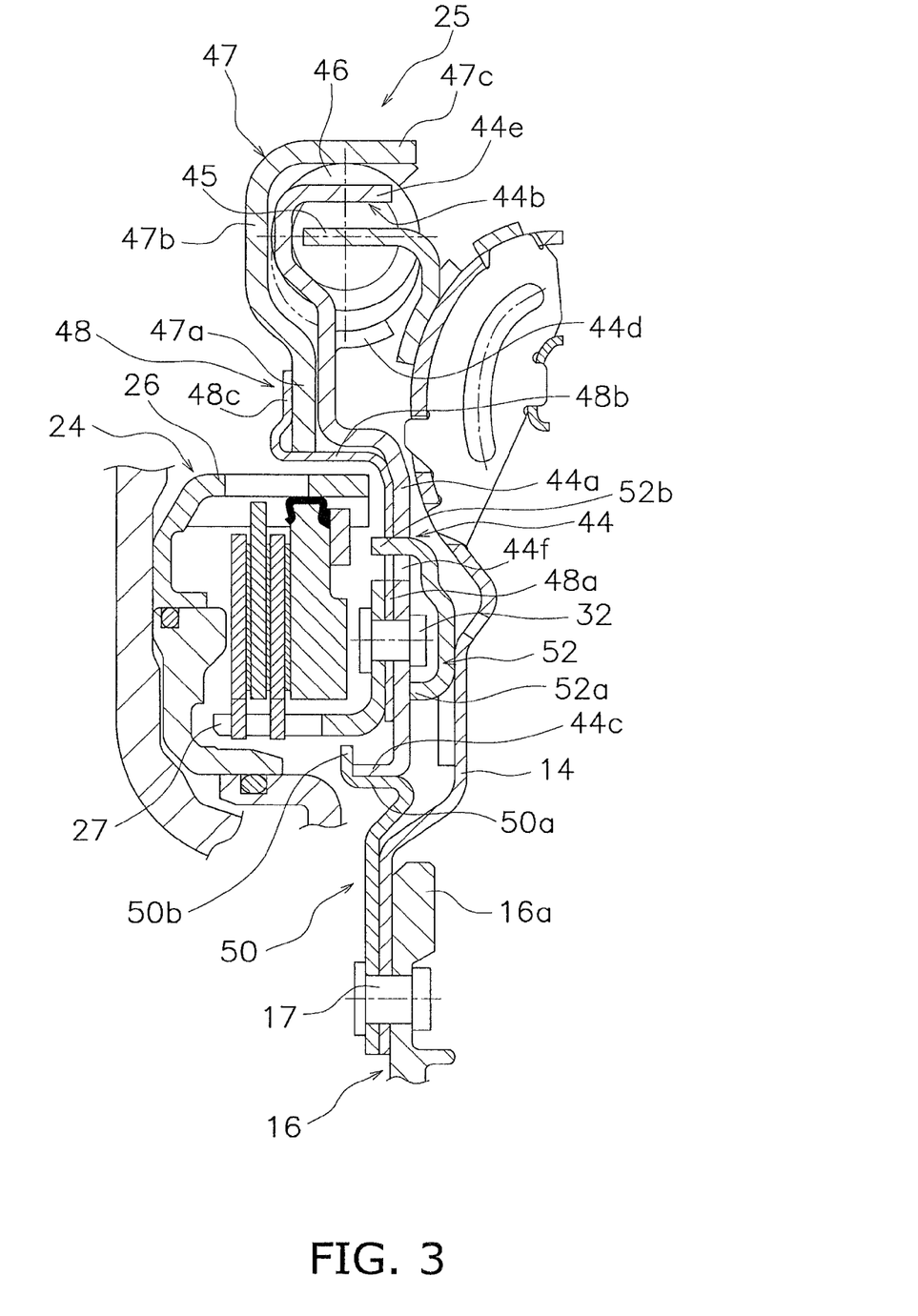
FIG. 3 is an enlarged view of a damper mechanism of the lock-up device illustrated in FIG. 1.

As illustrated in FIG. 3, the damper mechanism 25 includes: an input plate 44 to which the clutch output member 27 of the clutch part 24 is fixed; an output plate 45 fixed to the turbine shell 14 of the turbine 4; a plurality of torsion springs 46; an intermediate member 47; and a restriction plate 48. It should be noted that FIG. 3 illustrates only the damper mechanism 25 and the related components thereof, which are extracted from the lock-up device 6.

The input plate 44 is formed in an annular shape and has: a disc portion 44a; spring accommodation portions 44b formed on the outer peripheral end of the disc portion 44a; and a support portion 44c that is formed on the inner peripheral end of the disc portion 44a while being extending towards the engine. As described above, the clutch output member 27 is fixed to the disc portion 44a by the rivets 32. The spring accommodation portions 44b have: spring support portions 44d for supporting the inner peripheral sides of the torsion springs 46; and engaging portions 44e for supporting the end surfaces of the torsion springs 46.

The output plate 45 is engaged with the both circumferential ends of each pair of two torsion springs 46 configured to act in series. Accordingly, the torque inputted from the input plate 44 is transmitted to the output plate 45 through the torsion springs 46, and is further transmitted to the turbine 4.

The plural torsion springs 46 are disposed in the spring accommodation portions 44b of the input plate 44. Here, totally eight torsion springs 46 are provided as pairs of two torsion springs.

The intermediate member 47 is a member for causing each pair of two torsion springs 46 to act in series. The intermediate member 47 is formed in an annular shape and has a cross-section formed in an inverted L-shape. The intermediate member 47 is disposed on the outer peripheral side of the clutch part 24 (especially, the clutch input member 26) and has an inner peripheral end portion 47a, a lateral support portion 47b and an outer support portion 47c. The inner peripheral end portion 47a is extending to the inner peripheral side along the disc portion 44a of the input plate 44. The lateral support portion 47b is extending to the outer peripheral side from the inner peripheral end portion 47a, and supports the engine side (front-cover-2 side) lateral portions of the torsion springs 46. Further, pawls (not illustrated in the figures), supporting the end surfaces of each pair of the torsion springs 46, are formed in a shape extending from the lateral support portion 47b towards the transmission (i.e., towards the turbine 4). The outer support portion 47c is extending towards the transmission from the outer peripheral end of the lateral support portion 47b, and supports the outer peripheral parts of the torsion springs 46.

The restriction plate 48 is formed by a plate with a plate thickness less than that of the intermediate member 47. The restriction plate 48 is formed in an annular shape, and has a fixation portion 48a, a radial restriction portion 48b and an axial restriction portion 48c. The fixation portion 48a is formed in a disc shape, and is fixed to the clutch output member 27 and the input plate 44 by the rivets 32 while the inner peripheral part thereof is interposed between these members 27 and 44. The radial restriction portion 48b is formed in a shape extending towards the engine from the outer peripheral end of the fixation portion 48a, whereas the axial restriction portion 48c is formed in a shape bent to the further outer peripheral side from the tip end of the radial restriction portion 48b. The inner peripheral end of the intermediate member 47 is disposed in contact with or in the vicinity of the radial restriction portion 48b. Further, the inner peripheral end portion 47a of the intermediate member 47 is interposed and held between the axial restriction portion 48c and the input plate 44.

With the aforementioned structure, the intermediate member 47 is restricted from radially moving by the radial restriction portion 48b of the restriction plate 48, while being restricted from axially moving by the axial restriction portion 48c of the restriction plate 48.

Further, an input plate support member 50 is mounted to the inner peripheral side of the input plate 44. The input plate support member 50 is formed in an annular shape and the inner peripheral end portion thereof is fixed together with the turbine shell 14 to the turbine hub 16 by the rivets 17. A plate support portion 50a and a stopper portion 50b are formed in the outer peripheral part of the input plate support member 50. The plate support portion 50a is formed in a tubular shape and supports the inner peripheral surface of the support portion 44c of the input plate 44. Further, the stopper portion 50b is formed by bending the tip end of the plate support portion 50a to the outer peripheral side. The stopper portion 50b allows the tip end of the support portion 44c of the input plate 44 to make contact therewith, and thus restricts the damper mechanism 25 from entirely moving towards the engine.

As illustrated in FIG. 3, a stopper ring 52 is fixed to the engine-side surface of the turbine shell 14. The stopper ring 52 is formed in an annular shape, and has a plurality of inner stopper pawls 52a and a plurality of outer stopper pawls 52b. The inner stopper pawls 52a are formed by cutting the inner peripheral part of the stopper ring 52 and raising the cut portions towards the engine. The outer stopper pawls 52b are formed by cutting the outer peripheral part of the stopper ring 52 and raising the cut portions towards the engine.

The inner stopper pawls 52a are contactable with the turbine-4-side surface of the input plate 44, and accordingly, restrict the damper mechanism 25 from entirely moving towards the turbine. On the other hand, the outer stopper pawls 52b are inserted into stopper grooves 44f formed on the input plate 44. Each stopper groove 44f is an elongated groove with a predetermined circumferential length greater than the circumferential length of each outer stopper pawl 52b. Accordingly, the torsional angle of the damper mechanism 25 is restricted to a predetermined angular range.

[Actions]

When the lock-up device 6 is in a clutch-off state, the operating oil is not supplied to the space produced between the piston 30 and the front cover 2. In this case, the torque from the front cover 2 is transmitted to the turbine 4 from the impeller 3 through the fluid.

By contrast, when the operating oil is supplied to the space produced between the piston 30 and the front cover 2, the piston 30 is moved towards the transmission. Accordingly, the drive plate 28 and the driven plates 29a and 29b are pressed against each other.

The lock-up device 6 is thereby turned into a clutch-on state, and the torque from the front cover 2 is transmitted to the damper mechanism 25 through the sequential path of: the clutch input member 26; the drive plate 28 and the driven plates 29a and 29b; and the clutch output member 27 in this order.

In the damper mechanism 25, the torque inputted into the input plate 44 from the clutch part 24 is transmitted to the turbine 4 through the torsion springs 46 and the output plate 45, and is further transmitted to the input shaft of the transmission through the turbine hub 16.

In the lock-up device 6 as described above, the intermediate member 47 is restricted from moving in both of the radial direction and the axial direction by the restriction plate 48.

Therefore, actuation can be stabilized. Further, the damper mechanism 25 is restricted from radially moving by the input plate support member 50, while being restricted axially moving by the input plate support member and the stopper ring 52. Therefore, actuation can be stabilized.

[Features]

In the present exemplary embodiment as described above, moving of the intermediate member 47 is restricted by the restriction plate 48. Therefore, the space occupied by the lock-up device 6 can be reduced. Especially, the restriction plate 48 is formed with a thickness less than that of the intermediate member 47. Therefore, more space saving can be achieved. Particularly, a clutch part of a multi-plate type tends to occupy a large axial space. Therefore, the axial space can be reduced with use of the restriction member in the present exemplary embodiment.

[Other Exemplary Embodiments]

The present invention is not limited to the exemplary embodiment as described above, and a variety of changes or modifications can be made without departing from the scope of the present invention.

Figure 4:
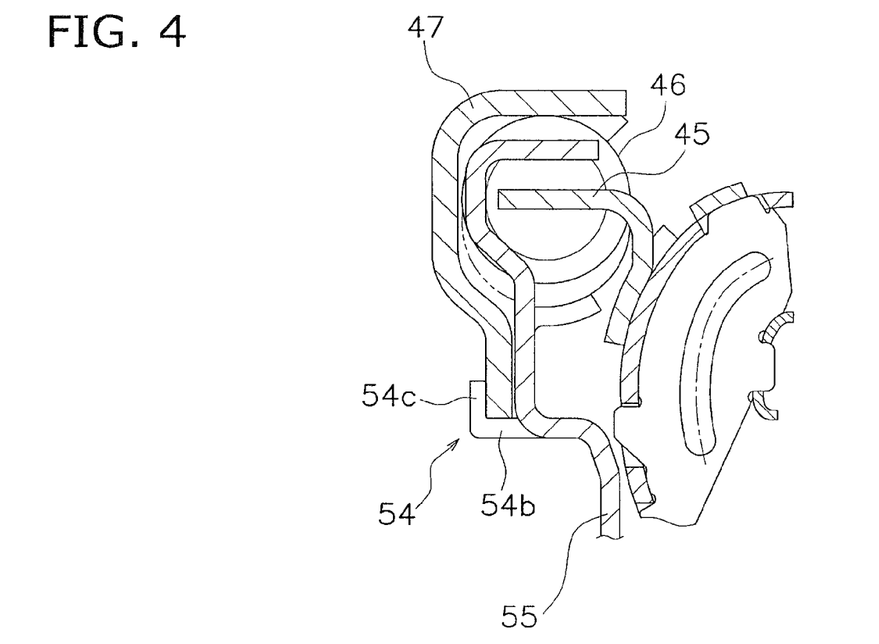
FIG. 4 is a diagram illustrating a restriction member according to another exemplary embodiment of the present invention.

(1) FIG. 4 illustrates another example of the restriction member. A restriction member 54 illustrated in FIG. 4 is formed by bending a part of an input plate 55 composing the damper mechanism. In other words, a radial restriction portion 54a is formed by bending a part of the input plate 55 towards the engine, and further, an axial restriction portion 54b is formed by bending the tip end of the radial restriction portion 54a to the outer peripheral side. The inner peripheral end of the intermediate member 47 is supported by the radial restriction portion 54a, whereas the inner peripheral end portion of the intermediate member 47 is interposed and held between the axial restriction portion 54b and a part of the input plate 55, i.e., a part extending to the outer peripheral side.

It should be noted that the axial restriction portion 54b is formed on the input plate 55 partially in the circumferential direction without being formed thereon entirely in the circumferential direction. Further in assembling, the intermediate member 47 is set such that the inner peripheral end portion thereof is not overlapped with the axial restriction portion 54b. Subsequently, the intermediate member 47 is rotated relatively to the axial restriction portion 54b, and is accordingly positioned in such a state as illustrated in FIG. 4.

Figure 5:
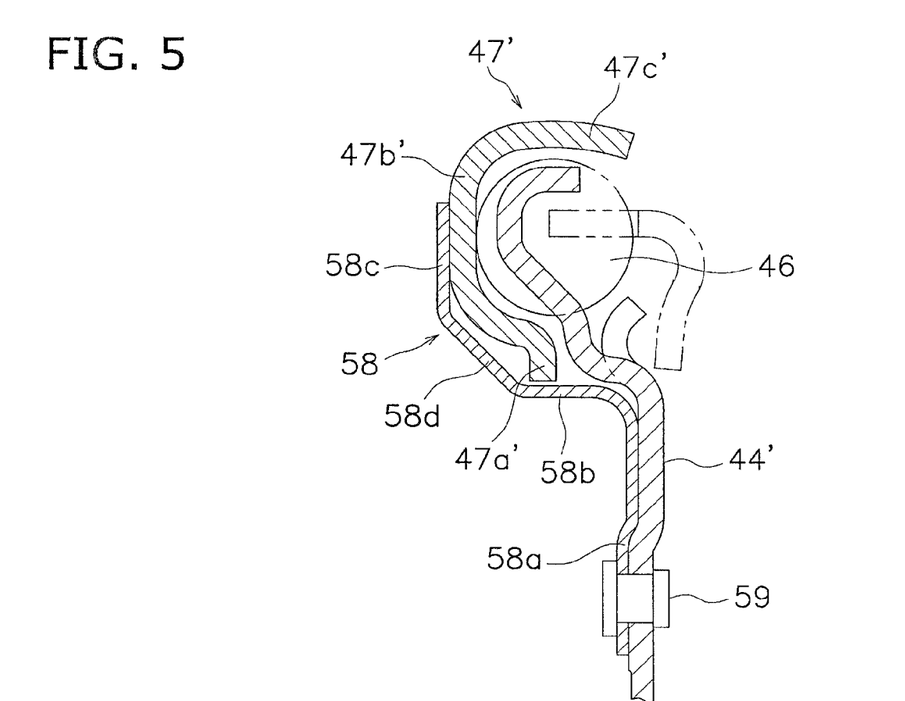
FIG. 5 is a diagram illustrating a restriction member according to yet another exemplary embodiment of the present invention.

(2) FIG. 5 illustrates yet another example of the restriction member. An intermediate member 47' of this example has a structure similar to that described in the aforementioned exemplary embodiment. In short, the intermediate member 47' is formed in an annular shape and has a cross-section formed in an inverted L-shape. The intermediate member 47' has an inner peripheral end portion 47a', a lateral support portion 47b' and an outer support portion 47c'.

A restriction plate 58 in the present exemplary embodiment is formed by a plate with a plate thickness less than that of the intermediate member 47'. The restriction plate 58 is formed in an annular shape, and has a fixation portion 58a, a radial restriction portion 58b, an axial restriction portion 58c and a coupling portion 58d. The fixation portion 58a is formed in a disc shape, and the inner peripheral part thereof is fixed to the input plate 44' by rivets 59. The radial restriction portion 58b is formed in a shape extending towards the engine (towards the front cover 2) from the outer peripheral end of the fixation portion 58a. The coupling portion 58d is formed in a shape bent from the tip end of the radial restriction portion 58b to the further outer peripheral side and the engine side. The axial restriction portion 58c is formed in a shape that is bent from the tip end of the coupling portion 58d roughly in parallel to the input plate 44' and is extending to the outer peripheral side.

In such structure, the inner peripheral end of the intermediate member 47' is disposed in contact with or in the vicinity of the outer peripheral surface of the radial restriction portion 58b. Further, the lateral support portion 47b' of the intermediate member 47' is interposed and held between the axial restriction portion 58c and the torsion springs 46.

With the structure as described above, the intermediate member 47' is restricted from radially moving by the radial restriction portion 58b of the restriction plate 58, while being restricted from axially moving by the axial restriction portion 58c of the restriction plate 58.

It should be noted that the other structures are similar to those of the aforementioned exemplary embodiment illustrated in FIGS. 1 to 3.

Even the present exemplary embodiment as described above can achieve advantageous effects similar to those achieved by the aforementioned exemplary embodiment.

INDUSTRIAL APPLICABILITY

The present invention implements a mechanism for restricting an intermediate member with a smaller space in a lock-up device equipped with a clutch part of a multi-plate type that a piston and a damper mechanism are disposed in positions away from each other.

Advantageous Effects of Invention

In the present invention as described above, a mechanism for restricting an intermediate member can be implemented with a smaller space in a lock-up device equipped with a clutch part of a multi-plate type that a piston and a damper mechanism are disposed in positions away from each other.

The invention claimed is:

1. A lock-up device for a torque converter, the lock-up device being configured to allow or block transmission of a torque from a front cover to a turbine of the torque converter, the lock-up device comprising:
   a clutch part being disposed between the front cover and the turbine, the clutch part including a plurality of clutch plates and a piston for pressing the plurality of clutch plates to each other, the clutch part being configured to allow or block the transmission of the torque; and
   a damper mechanism being configured to transmit the torque from the clutch part to the turbine, and absorb and attenuate a torsional vibration, wherein
   the damper mechanism includes
      an input-side member to which the torque is inputted from the clutch part,
      an output-side member being connected to the turbine;
      a plurality of elastic members elastically coupling the input-side member and the output-side member in a rotational direction,
      an intermediate member being configured to cause at least two of the plurality of elastic members to act in series, the intermediate member being formed as an annular plate and being rotatable relatively to the input-side member and the output-side member, and
      a restriction member being configured to restrict the intermediate member from moving in both of a radial direction and an axial direction, the restriction member being fixed at an inner peripheral part thereof to the input-side member, the restriction member including a radial restriction portion and an axial restriction portion on an outer peripheral part thereof, the radial restriction portion being configured to restrict the intermediate member from moving in the radial direction by supporting an inner peripheral end of the intermediate member, the axial restriction portion being configured to restrict the intermediate member from moving in the axial direction by interposing an inner peripheral end portion of the intermediate member between the axial restriction portion and the input-side member of the damper mechanism.

2. The lock-up device for a torque converter recited in claim 1, wherein the intermediate member includes an inner peripheral end portion extending along the input-side member, a lateral support portion supporting front-cover-side lateral parts of the elastic members, and an outer support portion extending towards the turbine from an outer peripheral end of the lateral support portion, the outer support portion supports outer peripheral parts of the elastic members, and the restriction member is fixed at an inner peripheral part thereof to the input-side member of the damper mechanism, the restriction member includes a radial restriction portion and an axial restriction portion on an outer peripheral part thereof, the radial restriction portion is configured to restrict the intermediate member from moving in the radial direction by supporting an inner peripheral end of the intermediate member, the axial restriction portion is configured to restrict the intermediate member from moving in the axial direction by interposing the lateral support portion of the intermediate member between the axial restriction portion and the elastic members.

3. The lock-up device for a torque converter recited in claim 1, wherein the plurality of elastic members, the intermediate member, and both of the radial restriction portion and the axial restriction portion of the restriction member are disposed on an outer peripheral side of the clutch part.

4. The lock-up device for a torque converter recited in claim 1, wherein the restriction member is a plate member with a thickness less than a thickness of the intermediate member.

5. The lock-up device for a torque converter recited in claim 1, wherein the restriction member includes a radial restriction portion and an axial restriction portion, both of the radial restriction portion and the axial restriction portion are formed on a part of the input-side member of the damper mechanism, the radial restriction portion is configured to restrict the intermediate member from moving in the radial direction by supporting an inner peripheral end of the intermediate member, the axial restriction portion is configured to restrict the intermediate member from moving in the axial direction by interposing an inner peripheral end portion of the intermediate member between the axial restriction portion and the input-side member of the damper mechanism.

\* \* \* \* \*